United States Patent
Strandberg (10) Patent No.: US 7,302,051 B1
(45) Date of Patent: Nov. 27, 2007

(54) SYSTEM AND METHOD FOR PROVIDING AN AUTOMATIC TELEPHONE CALL BACK FROM INFORMATION PROVIDED AT A DATA TERMINAL

(75) Inventor: Malcom B. Strandberg, Cambridge, MA (US)

(73) Assignee: Aspect Software, Inc., Chelmsford, MA (US)

( * ) Notice: Subject to any disclaimer, the term of this patent is extended or adjusted under 35 U.S.C. 154(b) by 0 days.

(21) Appl. No.: 09/161,816

(22) Filed: Sep. 28, 1998

(51) Int. Cl.
*H04M 3/42* (2006.01)
*H04M 3/00* (2006.01)

(52) U.S. Cl. .......................... 379/210.01; 379/265.01; 379/266.07

(58) Field of Classification Search ............... 379/265, 379/266, 309, 355, 209, 210.01
See application file for complete search history.

(56) References Cited

U.S. PATENT DOCUMENTS

| | | | |
|---|---|---|---|
| 4,052,570 A * | 10/1977 | Sutton | 379/355.09 |
| 4,065,642 A * | 12/1977 | McClure | 379/157 |
| 4,143,243 A * | 3/1979 | Sutton | 379/357.04 |
| 4,166,929 A | 9/1979 | Sheinbein | 379/209 |
| 4,748,511 A | 5/1988 | Nicholes et al. | 358/433 |
| 4,764,949 A * | 8/1988 | Faith et al. | 379/22 |
| 4,881,261 A * | 11/1989 | Oliphant et al. | 379/215 |
| 5,185,782 A * | 2/1993 | Srinivasan | 379/207.03 |
| 5,214,688 A * | 5/1993 | Szlam et al. | 379/88.22 |
| 5,247,569 A * | 9/1993 | Cave | 379/113 |
| 5,436,965 A | 7/1995 | Grossman et al. | 379/266 |
| 5,555,179 A | 9/1996 | Koyama | 700/95 |
| 5,590,183 A | 12/1996 | Yoneda et al. | 379/142 |
| 5,592,538 A * | 1/1997 | Kosowsky et al. | 379/93.08 |
| 5,594,791 A * | 1/1997 | Szlam et al. | 379/265 |
| 5,710,803 A * | 1/1998 | Kowal et al. | 379/41 |
| 5,742,674 A | 4/1998 | Jain et al. | 379/209 |
| 5,761,289 A * | 6/1998 | Keshav | 379/210.01 |
| 5,765,033 A | 6/1998 | Miloslavsky | 709/206 |
| 5,802,161 A | 9/1998 | Svoronos et al. | 379/216 |
| 5,809,128 A | 9/1998 | McMullin | 379/215 |
| 5,822,400 A | 10/1998 | Smith | 379/265 |
| 5,828,731 A | 10/1998 | Szlam et al. | 379/265 |
| 5,835,568 A * | 11/1998 | Bass et al. | 379/88.06 |
| 5,838,682 A | 11/1998 | Dekelbaum et al. | 370/401 |
| 5,884,032 A * | 3/1999 | Bateman et al. | 709/204 |
| 5,903,642 A | 5/1999 | Schwartz et al. | 379/309 |

(Continued)

*Primary Examiner*—Rasha S. Al-Aubaidi
(74) *Attorney, Agent, or Firm*—Bourque and Associates (57) ABSTRACT

The system and method provides an automatic telephone call back in response to a request for assistance made at a remote data terminal by an inquiring party. The inquiring party provides information at the data terminal, the information is transferred over a data path, such as the PSTN, the Internet, or any other WAN or LAN or combination thereof, to the automated telephone call back system. A data path interface at the automated back system provides an interface or gateway between the data path and an automated dialer system. The automated dialer system retrieves telephone numbers provided by the inquiring parties, schedules the call backs, and automatically dials the telephone numbers using a predictive dialer. If a connection is made, the dialer will automatically connect the called party to an available agent, and any additional information about the called party, if available, will be transmitted to the agent's terminal by the call back manager. The automatic dialing system can also continuously dial a busy telephone number provided by an inquiring party, in order to ensure that they are contacted as soon as possible.

17 Claims, 4 Drawing Sheets

U.S. PATENT DOCUMENTS

| | | | |
|---|---|---|---|
| 5,914,951 A | 6/1999 | Bentley et al. | 379/265 |
| 5,926,539 A | 7/1999 | Shtivelman | 379/266.01 |
| 5,946,386 A * | 8/1999 | Rogers et al. | 379/265 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 5,956,393 A * | 9/1999 | Tessler et al. | 379/137 |
| 5,991,394 A | 11/1999 | Dezonno et al. | 379/265 |
| 6,002,760 A | 12/1999 | Gisby | 379/266.01 |
| 6,021,428 A | 2/2000 | Miloslavsky | 709/206 |
| 6,044,145 A | 3/2000 | Kelly et al. | 379/265.02 |
| 6,044,368 A | 3/2000 | Powers | 707/2 |
| 6,067,357 A | 5/2000 | Kishinky et al. | 379/265.02 |
| 6,108,711 A | 8/2000 | Beck et al. | 709/242 |
| 6,134,530 A * | 10/2000 | Bunting et al. | 705/7 |
| 6,138,139 A | 10/2000 | Beck et al. | 709/202 |
| 6,167,395 A | 12/2000 | Beck et al. | 707/3 |
| 6,170,011 B1 | 1/2001 | Macleod Beck et al. | 709/224 |
| 6,175,563 B1 | 1/2001 | Miloslavsky | 370/352 |
| 6,175,564 B1 | 1/2001 | Miloslavsky | 370/352 |
| 6,185,292 B1 | 2/2001 | Miloslavsky | 379/265.01 |
| 6,345,305 B1 | 2/2002 | Beck et al. | 709/242 |
| 6,373,836 B1 | 4/2002 | Deryugin et al. | 370/352 |
| 6,389,007 B1 | 5/2002 | Shenkman et al. | 370/352 |
| 6,393,015 B1 | 5/2002 | Shtivelman | 370/352 |
| 6,732,156 B2 | 5/2004 | Miloslavsky | 709/206 |
| 2001/0040887 A1 * | 11/2001 | Shtivelman et al. | 370/352 |

* cited by examiner

SYSTEM AND METHOD FOR PROVIDING AN AUTOMATIC TELEPHONE CALL BACK FROM INFORMATION PROVIDED AT A DATA TERMINAL

FIELD OF THE INVENTION

The present invention relates to telephony systems and more particularly, to a system and method for providing an automatic telephone call back in response to a request provided from a data terminal.

BACKGROUND OF THE INVENTION

Telephony call centers, which place outbound calls and receive inbound calls (often called call campaigns), typically utilize a telephone call center management system to help automate much of the process. The telephone call center management system controls, among other functions, the dialing of outbound telephone numbers from a predefined, sorted call list having a number of customer call records. These customer call lists may be downloaded from a call record source, such as a host computer, to the telephone call center management system once during a 24 hour period, often during the non-busy early hours of the morning, or may be continuously and dynamically downloaded for dynamic updating of call records within a call list. The telephone call center management system automatically connects outbound calls and inbound calls to available operators or agents for handling.

In the past, the overwhelming majority of customers or potential customers (collectively "inquiring parities") contacted the call center by telephone to obtain information. These inquiring parties may be calling for many different reasons. For example, the inquiring parties may want information on the company's products or services, or may want information on their existing account with the company. Often there are no agents available at the company to provide the requested information, and the inquiring party must wait on hold for an available agent, receive the information by way of recorded messages, or call back at another time.

With the advent of global or large scale computer networks such as the Internet (also known as the World Wide Web), it is now possible for companies to provide information "on-line" that is accessible by its customers or potential customers via a data terminal (e.g. a PC) connected to the network. A company may provide "on-line" information about products and/or services that might be of interest to an inquiring party, as well as information on the status of a party's account. One way of providing on-line information is with hypertext documents on the World Wide Web created using Hypertext Markup Language (HTML). By browsing through these "web pages" using the data terminal, the inquiring party can obtain information in the form of text, graphics and/or sound.

Although the Internet or other such computer network provides an additional medium for communicating information to inquiring parties, a party may still want assistance from a "live" agent. Some "web pages" allow inquiring parties to request a call back by including a field for the inquiring party to provide a telephone number or other such information related to contacting the party with a "live" agent. These requests are typically transmitted to the company, for example, in the form of electronic mail and stored in a file. The telephone numbers and other relevant information are then manually entered into an existing telephone call center management system. The call back is then made at a later, less convenient time using the existing telephony system, e.g., by having an agent manually call back or by calling back and placing the party on hold. If the inquiring party needs assistance, e.g., with an account, a product/service, or the like, the existing systems are unable to provide that assistance at the time requested by the inquiring party.

An immediate call back is often the ideal time for responding to a request by the inquiring party. The inquiring party is interested in this particular product, service, or information at the moment the request is made and is likely to be proximate to a telephone. Providing an immediate connection to an agent, however, presents an additional problem. One common way to connect to the Internet/World Wide Web is by using a PC with a modem that dials in to an Internet Service Provider (ISP) over the Public Switched Telephone Network (PSTN). If the only available telephone line is being used for connecting to the network, an immediate call back may not be possible since the inquiring party is likely to still be connected to the network (i.e., "on-line") when the attempted call back is made. When dialing outbound calls, existing telephony systems will typically treat a busy signal as a failed attempt and will schedule a recall at a later point in time. Thus, the inquiring party will not receive the assistance as soon as possible after the request has been made.

As the usage of the Internet and other global computer networks increases, an increasing number of individuals will want to use this medium of communication to contact companies for requesting information. Existing telephone call center management systems are not integrated with global computer networks in a manner that allows a company to automatically and efficiently respond to requests made over the global computer network by inquiring parties with call backs at the most convenient time.

Accordingly, what is needed is an system and method for providing an automatic telephone call back to an inquiring party who has provided a request to a company from a remote data terminal. What is also needed is an automatic call back system and method that employs call scheduling and predictive dialing to ensure that a call back is made at a time convenient to the inquiring party, e.g. immediately or at another time specified by the inquiring party.

SUMMARY OF THE INVENTION

The present invention features a system and method for providing a telephone call back from call back data transmitted over a data path, such as a global computer network, using a data terminal at a remote location. The system includes a data path interface coupled to the data path, for receiving the request, for identifying the call back data, and for placing the call back data into at least one call record store. The system further includes an automatic dialing system responsive to the call record store, for retrieving the telephone numbers in the call record store, automatically calling the numbers, and connecting to an available agent if a call is answered.

The automatic dialing system preferably includes a call scheduler, for ordering and scheduling the telephone numbers to be called, and a predictive dialer, responsive to the ordered telephone numbers, for initiating dialing of each of the numbers. The predictive dialer preferably includes a call pacer that paces dialing of the telephone numbers using a pacing algorithm.

The present invention also features a method for providing a telephone call back from a request made by an inquiring party at remote location. The request includes call back data transmitted over a data path, such as the global computer network, from a terminal at the remote location. The method comprising the steps of: receiving the request transmitted from the terminal at the remote location; identifying the call back data including at least one telephone number to be dialed; placing the call back data into a call record store; retrieving telephone numbers to be dialed from the call record store; scheduling the telephone numbers to be dialed; automatically dialing each of the telephone numbers as scheduled over a telephone line; and connecting the telephone line to a telephone of an available agent, if an answer is detected.

In one embodiment, the method includes the step of attempting to immediately connect the inquiring party to an available agent, for example, using the global computer network. The method also includes scheduling at least one of the numbers for an immediate call back and scheduling at least one of the numbers for a call back at a time to call provided by the inquiring party in the call back data. If no connection is made, the method includes the step of adding the telephone number to a future call campaign.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
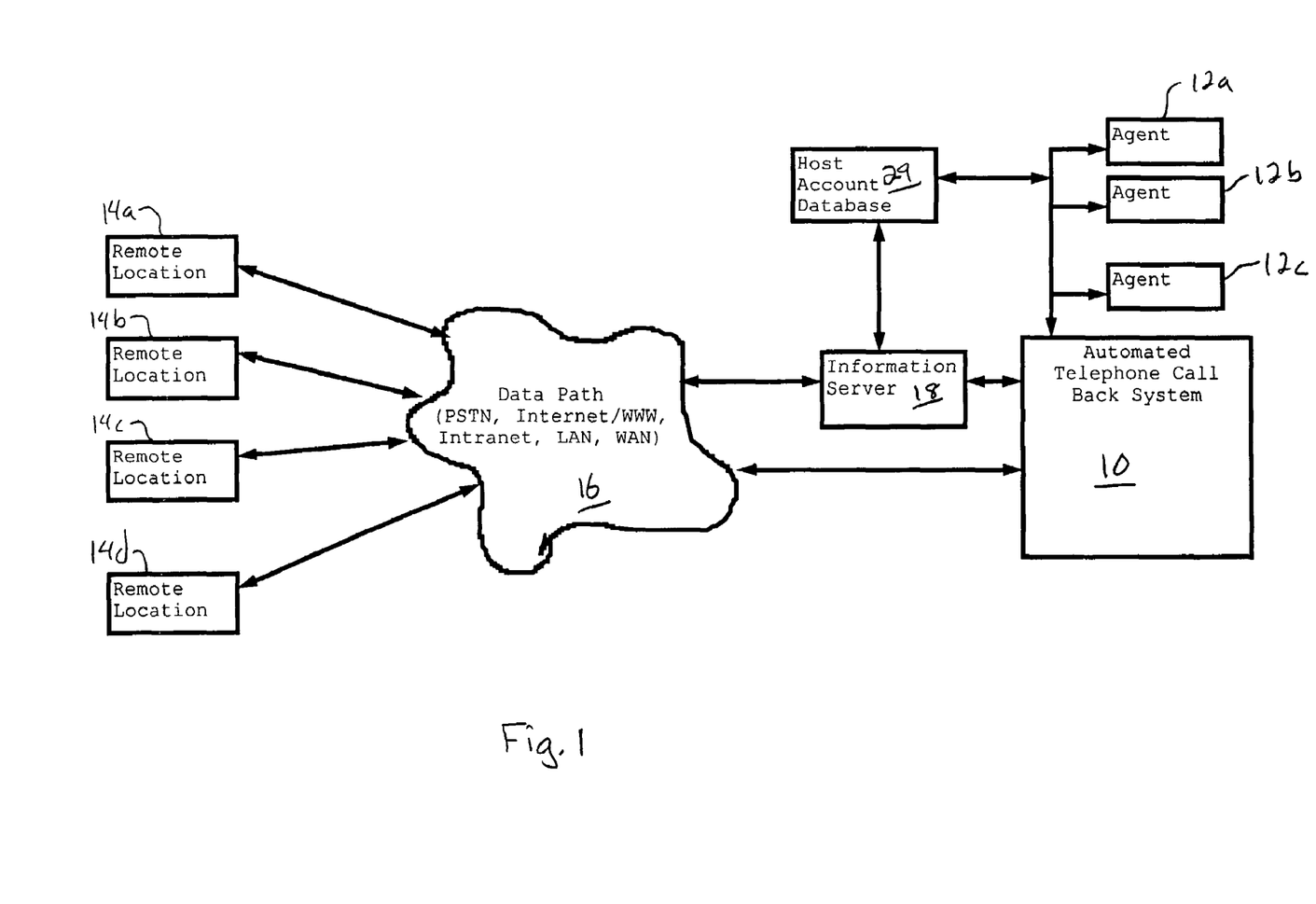
FIG. 1 is a schematic block diagram of an automated telephone call back system, according to the present invention, that receives requests from remote locations over a data path.

The automated telephone call back system 10, FIG. 1, according to the present invention, provides an automatic telephone call back to an inquiring party (e.g., a customer or potential customer) who has requested assistance from a "live" agent 12a-12c at a call center in a company or other organization. The request is made from a remote location 14a-14d that includes a data entry device, such as a PC, connected to the automated telephone call back system 10 by way of a data path 16. The data path 16 can be established through the Public Switched Telephone Network (PSTN), the Internet/World Wide Web, an intranet, any type of Wide Area Network (WAN), any type of Local Area Network (LAN), and/or any other type of communication medium, as will be described in greater detail below.

The inquiring party typically makes the request after making an initial inquiry for information, such as product/service or customer account information. This information is typically provided by an information server 18 that is accessed by the inquiring party at the remote location 14a-14d by way of the data path 16. In one example, the information server 18 is a web server that presents the information in the form of "web pages" including on-line forms for entry of call back data used to make a call back (e.g., telephone number, call back time) as well as other inquiring party data (e.g., name, account number, products/services of interest), as will be described in greater detail below.

When a call back request is made, call back data and other data is transmitted over the data path 16 to the automated telephone call back system 10 either directly or by way of the information server 18. The automated telephone call back system 10 processes the request and schedules a call back at a time when the inquiring party is likely to be available, e.g. immediately following the request or at a desired time specified by the inquiring party.

Figure 2:
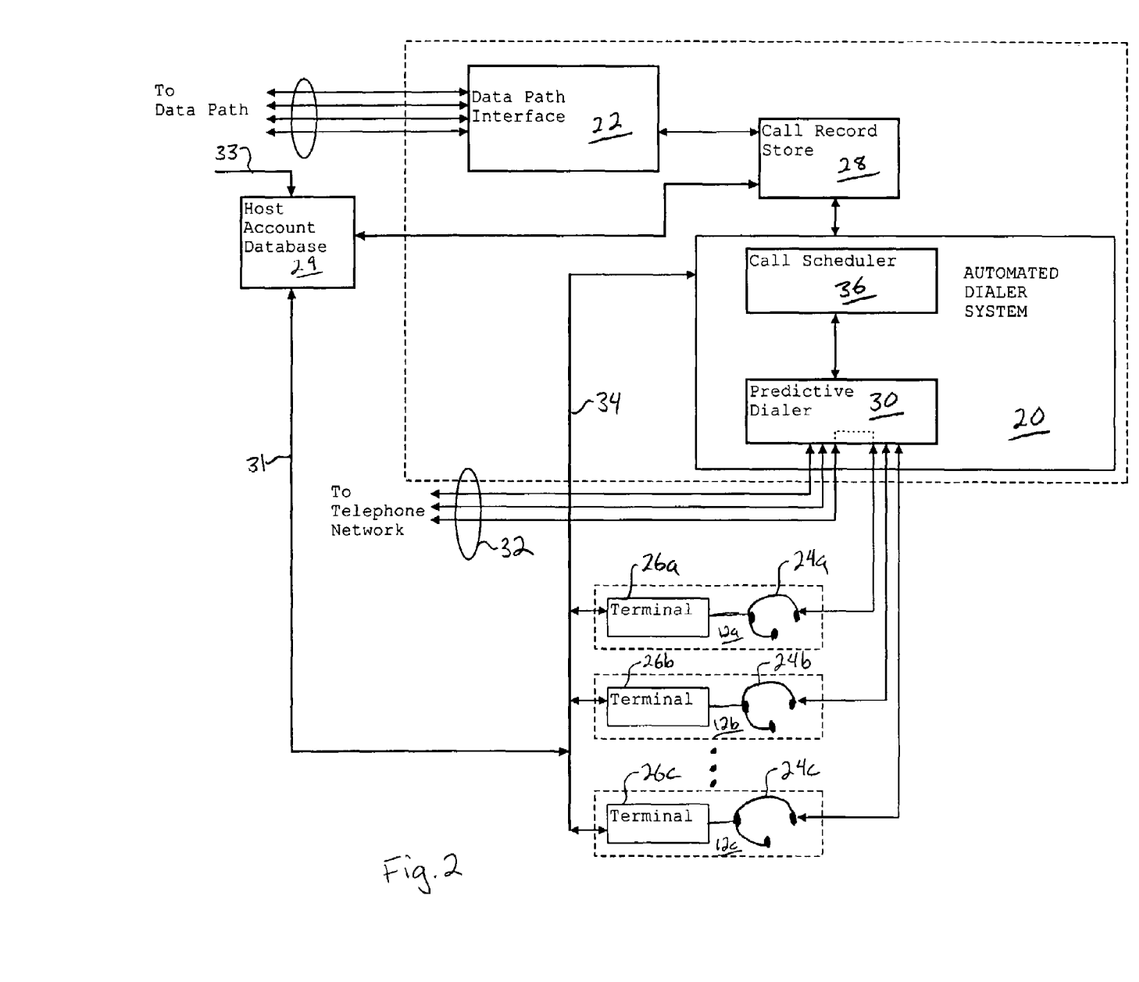
FIG. 2 is a schematic block diagram of the automated telephone call back system, according the preferred embodiment of the present invention.

According to the preferred embodiment, the automated telephone call back system 10, FIG. 2, includes an automated dialer system 20, for processing outbound call campaigns, and a data path interface 22, for providing an interface or gateway between the automated dialer system 20 and the data path 16 over which the call back request is made. According to one example, the automated dialer system 20 is implemented as part of a telephony system, such as the type sold under the name UNISON® by Davox Corporation, Westford, Mass. This type of telephony system is disclosed in greater detail in U.S. Pat. No. 5,592,543 issued Jan. 7, 1997, assigned to the assignee of the present application and incorporated herein by reference. In the telephony system, the agents 12a-12c each have a headset 24a-24c or other voice processing device and a computer terminal 26a-26c or other type of data input/output device connected to the automated dialer system 10. The data path interface 22, the automated dialer system 20, the agent terminals 26a-26c, and other components of the system 10 are connected with a data path 34, such as an ethernet network.

The data path interface 22 receives the call back data and other inquiring party data transmitted over the data path 16 and routes the call back data (e.g., telephone number, and time to call) to a call record store 28 storing the call back data as a list of call records. The call record store 28 can be a database record, computer memory array, disk file, or any other storage medium. The call record store 28 can be dynamically updated with new call records as call back requests are received by the data path interface 22. Other data pertaining to the inquiring party (e.g., name, address, account number, products/services of interest), may also be stored in a host account database 29. If the inquiring party has been previously contacted (e.g., an existing customer), additional data may be merged with the host account database 29. The host account database 29 can be updated by an upload of new data for each account at the end of a call campaign or at the end of a predetermined time interval (e.g., the end of the day). The host account database 29 can also be updated online by way of a link 31 to the agent terminals 26a-26c. Further, the host account database 29 can be updated by the user, e.g., by way of a link 33 from the information server 18.

The automated dialer system 20 then processes the call records in the call record store 28 as an outgoing telephone call campaign. The automated dialer system 20 retrieves the call records from the call record store 28 and processes the call records, for example, according to preselected system scripts. The automated dialer system 20 automatically dials the telephone numbers within the call records over one of the telephone (trunk) lines 32. The automated dialer system 20 monitors the status of the call progress signals on the telephone lines 32, and when an answer is detected, connects the call to a headset 24a-24c of the available agent. Other information pertaining to the called party can be linked by the automated dialer system 20 from the host account database 29 to the terminal 26a-26c of the available agent. The linked host data is preferably displayed simultaneously at the terminal 26a-26c of the agent connected to the call, for example, using software available from Davox Corp. such as Smart Buttons, Sixth Sense, or the host Java applets in LYRICall.

The automated dialer system 20 preferably includes a call scheduler 36 for determining the optimum time to call each of the numbers and for arranging the list call records accordingly. The call scheduler 36 is typically implemented as a software program and is described in U.S. patent application Ser. No. 08/699,292 entitled "Call Record Scheduling System And Method" assigned to the assignee of the present invention and incorporated herein by reference. The call scheduler 36 will prioritize the call records based upon call back data specified by the inquiring party. If no call back time is specified, the call records are given an immediate call back priority since the inquiring party is likely to be proximate to the telephone. Immediate call backs can be repeated until a non-busy signal is detected since the inquiring party may be using the telephone line to access the data path 16 (e.g., using a modem to connect to the Internet through an Internet Service Provider). One example of this type of system is disclosed in greater detail in co-pending, commonly-owned application Ser. No. 09/057,749 filed Apr. 9, 1998, entitled SYSTEM AND METHOD FOR PROVIDING AN AUTOMATIC TELEPHONE CALL BACK TO A TELEPHONE LINE BEING USED TO ACCESS A COMPUTER NETWORK, and incorporated herein by reference.

The automated dialer system 20 preferably includes a predictive dialer 30 that utilizes a call pacing algorithm which is designed to optimize the time utilization by the telephone call agents. A description of one type of predictive dialer and call pacing algorithm is disclosed in U.S. Pat. No. 5,295,184 assigned to the assignee of the present application and incorporated herein by reference. The predictive dialer 30 controls the automatic dialing of the call back numbers as well as the dialing of numbers in other active outbound campaigns to minimize the amount of time a called party will have to spend on hold.

Figure 3:
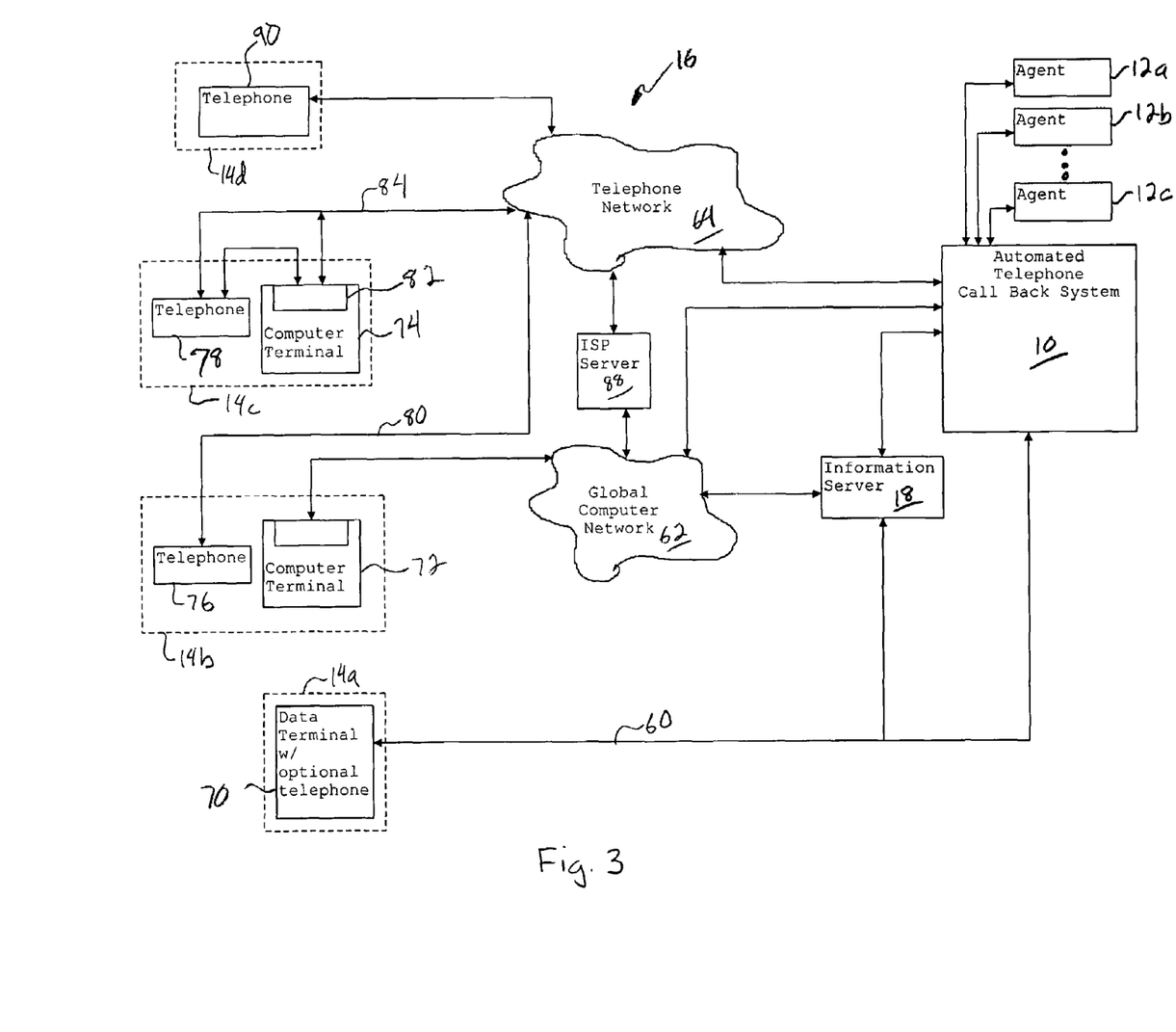
FIG. 3 is a schematic block diagram of the automated telephone call back system used with various types of data paths, according to the present invention.

The data path interface 22 can include a number of different types of interfaces depending upon the type of data path 16 being used to transmit the call back data. According to the exemplary applications of the present invention, the data path 16, FIG. 3, between the remote location 14a-14d and the automated telephone call back system 10 is established using one or more of the following: a direct data path 60, (e.g., a direct telephone line with a modem or an ethernet/token ring line); a global computer network 62 (e.g., the Internet/World Wide Web); and a telephone network 64 (e.g., the PSTN). The present invention contemplates using other types of data paths or communications media including other types of local area networks, wide area networks, or global information networks.

Where the direct data path 60 is used, a data terminal 70 at the remote location 14a, such as a mall or other public location, is directly connected to the information server 18, for example, using a direct telephone line with a modem or a Local Area Network (LAN) line to a LAN, such as an Ethernet or Token Ring network. In this example, the data path interface 22 provides an interface to that particular type of LAN, for communicating with the data terminal 70. The data terminal 70 can include a telephone with a direct telephone line to the automated dialer system 20 to allow telephonic communication with the inquiring party at the terminal 70. If a telephone is provided with the data terminal 70, an immediate call back can be made to the predetermined telephone number while the inquiring party is at the terminal 70. If no telephone is provided with the data terminal 70, the inquiring party can specify a telephone number and time for the return call.

Where the global computer network 62 is used to establish the data path 16, the remote location 14b, 14c includes a computer terminal 72, 74 connected to the global computer network 62, either directly or through the telephone network 64. In this example, the information server 18 includes a computer that generates hypertext documents using Hypertext Markup Language (HTML) containing the information to be accessed by the inquiring party. The computer terminal 72, 74 is used by the inquiring party to access the information and includes a user interface to display the hypertext documents provided by the information server 18 in the form of text, graphics, pictures, audio, and data (text) entry fields (commonly known as "web pages").

If assistance is needed from a live agent, a document is provided by the information server 18 that includes a data entry form requesting the data necessary to make a call back as well as other data pertinent to the request for assistance. The creation of data entry fields and the transmission of the entered data to the automated telephone call back system can be performed by a Common Gateway Interface (CGI) script that runs on the server 18 or a JAVA language program that runs on the computer terminal 72, 74.

The data is then transmitted from the computer terminal 72, 74 to the automated telephone call back system 10 over the global computer network 62. In this example, the data path interface 22 provides an interface to the global computer network 62, e.g., a direct connection to the Internet or a connection through the server 18, allowing the automated call back system 10 to receive the call back data and store the call back data as a call record in the call record store 28. In one example, the data path interface 22 includes a TCP/IP port on a computer that will accept call back data in fixed fields. The call back data can be formatted using techniques (e.g., encryption, authentication, etc.) that are well known in the art for network protocols.

Once received by the data path interface 22, the data can be posted to call record store 28. If the call record store 28 is server maintained, a socket connection similar to the data path interface can be used to post the data to the call record store 28. If the call record store 28 is a database, the data path interface 22 inserts or updates the appropriate table. If the call record store 28 is a file, the data path interface 22 appends to the end of the file. The automated dialer system 20 processes the call records in a call campaign, as described above, and based upon the request data, the call back can be made to a telephone 76, 78 at the location 14b, 14c or any other telephone number specified by the inquiring party. In addition to computer terminals 72, 74, the present invention contemplates other devices capable of receiving and transmitting information over the Internet/World Wide Web.

The data path interface 22 can also interface the agent terminals 26a-26c to the global computer network 62, allowing the inquiring party to exchange data and/or audio messages with the agent over the global computer network 62. According to this embodiment, the data path interface 22 includes well known firewall or proxy software to enable the agents 12a-12c to access the internet. To use the global computer network 62 as an audio data path to transmit audio in addition to data, the computer terminal 72, 74 and the agent terminal 26a-26c include voice over the internet packages, such as Webcall, Netmeeting, CU-See Me (Cornell University), and Cooltalk. Using voice over the internet or internet chat, an inquiring party at the computer terminal 72, 74 can be immediately connected to an agent at the terminal 26a-26c for assistance.

A direct connection to the global computer network 62 is established where computer terminal 72 at the remote location 14b, such as an office, is directly connected to the global computer network 62, for example, through a LAN having a direct internet connection by way of a leased line. This remote location 14b can also include a telephone 76 connected to the telephone network 64 on a telephone line 80 that is not used by the computer terminal 72 to access the global computer network 62. The telephone line 80 is thus available to receive a call back to telephone 76 while the computer terminal 72 is used to access the global computer network 62.

A connection to the global computer network 62 using the telephone network 64 is established where the computer terminal 74 at the remote location 14c, such as the inquiring party's residence, uses a modem 82 connected to a telephone line 84 into the telephone network 64. The modem 82 can be connected directly to the telephone line 84 or can be connected through a telephone 78 at the location 14c. The computer terminal 74 accesses the global computer network 62 by using the modem 82 to dial in to a global computer network server 88, for example, maintained by an Internet Service Provider (ISP), which provides an interface between the telephone network 64 and the global computer network. The present invention contemplates other types of "dial-up" connections to the internet using, for example, Integrated Services Digital Network (ISDN), a cellular telephone network, or other alternatives to conventional telephone connections.

For a "dial up" type connection, the same telephone line 84 is typically used by both the telephone 78 to receive calls and the computer terminal 74 to access the global computer network 62. Thus, the telephone line 84 may not be available for a call back to the telephone 78 if the telephone line 84 is still in use to access the global computer network 62. The present invention also contemplates using a modem 82 having voice/data capabilities that allows the computer terminal 74 to interrupt data transmission to talk with an available agent and then resume data transmission. The present invention also contemplates using call waiting in a "friendly" way to disconnect the modem 82 when an immediate call back is made.

Another type of data path 16 is an audio data path, for example, provided through the telephone network 64, which is accessed by a telephone 90 at the remote location 14d. In this example, the telephone 90 is used by the inquiring party to access recorded audio information at the information server 18 by way of the telephone network, for example, by dialing an 800 number. If assistance is needed from a "live" agent, the request data can be entered by DTMF tones or audio (voice) input in response to recorded audio prompts. In this example, the data path interface 22 includes an audio interface including, for example, a voice recognition unit (VRU) designed to encode audio responses as data, capable of being processed, stored, and retrieved digitally. One example of a VRU is disclosed in U.S. Pat. No. 5,164,981 assigned to the assignee of the present invention and incorporated herein by reference. After digitally encoding the data, the data path interface 22 stores the data as a call record in the call record store 28 and automatically performs a call back, as described above.

Figure 4:
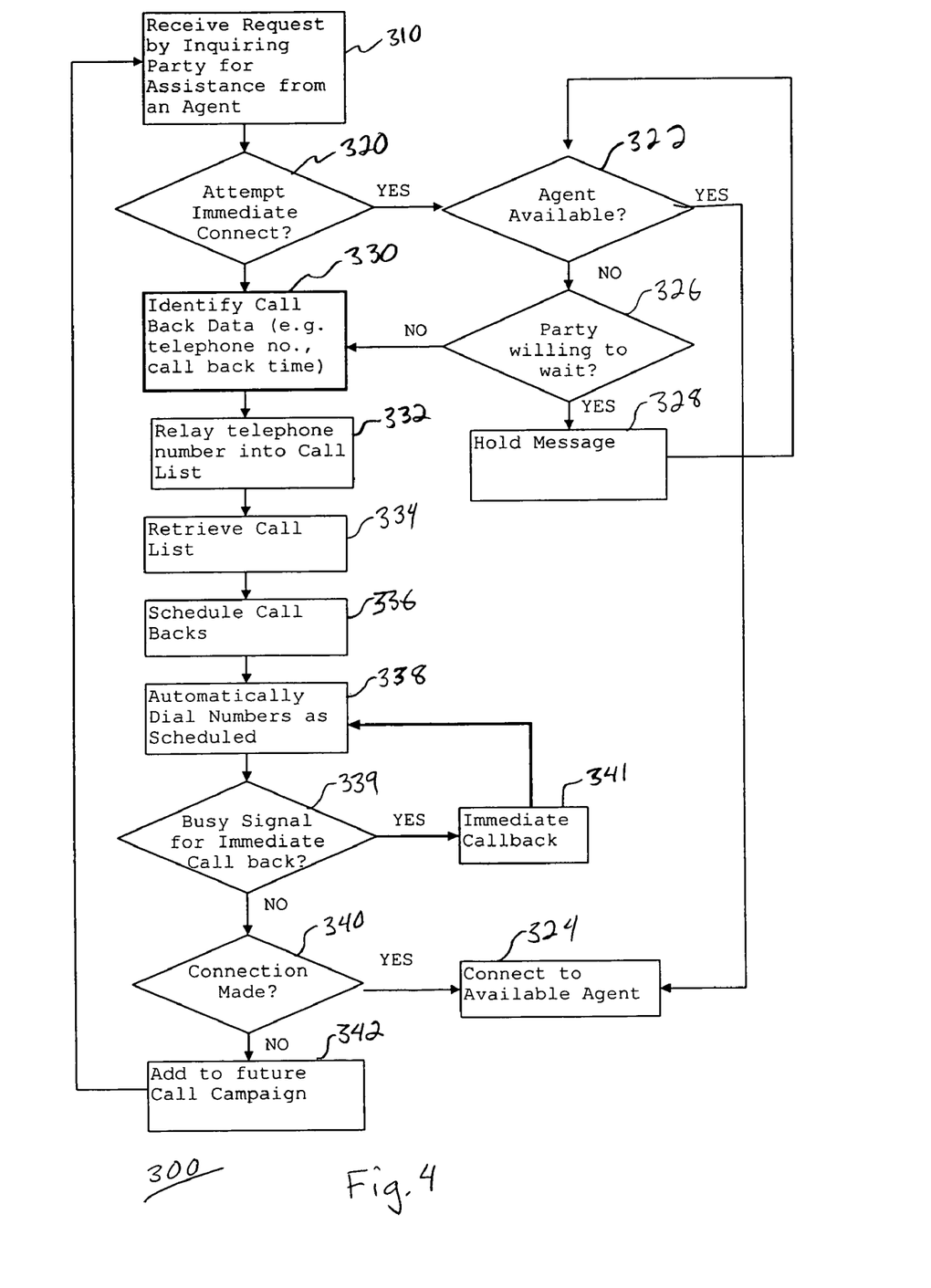
FIG. 4 is a flow chart illustrating the method of providing an automatic call back, according to the present invention.

The automatic telephone call back method 300, FIG. 4, according to the present invention, begins when the data path interface 22 of the automated telephone call back system 20 receives a request for assistance from an agent, step 310. In one embodiment, the automated telephone call back system 20 will attempt to immediately connect or transfer the inquiring party to an available agent, step 320. An immediate connection can be made, for example, if the inquiring party is using a telephone to request the information or if the inquiring party is using a terminal that supports voice over the internet or internet chat. In this example, the immediate connection of inquiring parties to agents can be controlled using a web inbound electronic chat distributor, as disclosed in co-pending, commonly owned application Ser. No. 09/052,514 filed Mar. 31, 1998, entitled WEB INBOUND CHAT DISTRIBUTOR, and incorporated herein by reference. The web inbound electronic chat distributor will determine if an agent is available, step 322, and will connect the available agent to the inquiring party, step 324. If no agent is available, and the inquiring party is willing to wait, step 326, a hold message is played or displayed to the inquiring party until an agent becomes available, step 328.

If the inquiring party is not willing to wait for an agent or if immediate connection is not possible, the call back data (e.g., the telephone numbers to be dialed and call back time) is identified by the data path interface 22, step 330, and relayed into the call record store 28, step 332. The automated dialer system 20 retrieves call records from the call record store, step 334, and, based upon other call back data transmitted by the inquiring party, determines the most convenient time for a call back and schedules the call backs accordingly, step 336. Unless the inquiring party specifies a different time, an immediate call back will be scheduled, since the inquiring party is likely to be proximate the telephone.

The telephone numbers are then automatically dialed either immediately or at the scheduled times, step 338, and the telephone lines 32 over which the call is being made are monitored. According to one example of the method where an immediate call back is made, the telephone lines 32 are monitored to determine if a busy signal is received, step 339, indicating that the telephone line connected to the telephone of the inquiring party is probably being used to connect to the global computer network 62. If a busy signal is detected, the predictive dialer will immediately, and in one embodiment continuously, redial the telephone number, step 341, for example, as disclosed in co-pending application Ser. No. 09/057,749 referenced above. This will ensure the connection of the telephone call as soon as the telephone line is free.

If a connection is made, step 340, the inquiring party is connected to an available agent, step 324, by transferring the voice to the agent's telephone 24a-24c and by transferring any other relevant data pertaining to the called party to the agent's terminal 26a-26c. If no connection is made, step 340, the telephone number is scheduled for a future call campaign to be called at a later time, step 342.

Accordingly, the automated telephone call back system of the present invention provides an automatic call back to an inquiring party (e.g., customer or potential customer) in response to a request made by the inquiring party while accessing information over a data path. In addition, the automated dialer system has the capacity to efficiently process the call backs by scheduling the calls as the most convenient time (e.g. a time specified by the inquiring party), by automatically dialing and pacing the calls so that an agent capable of handling the call will be immediately available when a connection is made. Moreover, if the inquiring party makes the request while on the Internet, the present invention is capable of contacting the inquiring party as soon as possible after the inquiring party has stopped using their computer modem.

Modifications and substitutions by one of ordinary skills in the art are considered to be within the scope of the present invention which is not to be limited except by the claims which follow.

What is claimed is:

1. A system for managing resources of a call center operating inbound and outbound call campaigns and minimizing an automatic telephone call back comprising:
    a first location including a telephone line and a data terminal and a telephone both connected to said telephone line, said data terminal generating a call back request requesting a call back to said telephone over said telephone network, wherein said first location cannot support voice and data communication simultaneously;
    a data path interface, coupled to said telephone line, for receiving said call back request over said telephone line, for identifying call back data from said request, and for placing said call back data into at least one call record store for an outbound campaign;
    an automated dialer system, located at a second location remote from said first location and coupled to said data path interface, and responsive to said at least one call record store, for automatically retrieving telephone numbers to be dialed from said call record store, and for processing said telephone numbers as an outbound telephone call campaign; and
    means for causing said automated dialer system to substantially immediately dial said telephone number to be dialed over said telephone line and for substantially immediately and continuously redialing said telephone number to be dialed each time said automated dialer detects a busy signal and for causing said automated dialer system to reschedule a regular telephone number each time said regular telephone number dialer detects a busy signal.

2. The system of claim 1 wherein said request further includes customer account identifying indicia.

3. The system of claim 1 wherein said call back data further includes a time to call back.

4. The system of claim 1 wherein said request further includes a message.

5. The system of claim 4 wherein said message includes a voice message.

6. The system of claim 4 wherein said message includes a textual message.

7. The system of claim 4 wherein said message includes a series of DTMF tones.

8. The system of claim 1 wherein said data terminal is a digital computer and said transmitted data includes digital data.

9. The system of claim 1 wherein said automated dialer system further includes a call scheduler, responsive to said at least one call record store, for ordering and scheduling said telephone numbers to be dialed.

10. The system of claim 9 wherein said automated dialer system further includes a predictive dialer, responsive to said ordered telephone numbers, for initiating dialing of each of said ordered telephone numbers.

11. A method for managing resources of a call center operating inbound and outbound call campaigns, said method comprising the acts of:

receiving a call back request transmitted from a data terminal at a remote location, wherein said remote location includes said data terminal and a telephone both directly connected to a single telephone line and said remote location cannot support voice and data simultaneously;
    identifying call back data from said request including a telephone number to be dialed, said telephone number associated with said telephone at said remote location;
    placing said call back data into a call record store for an outbound campaign;
    scheduling said telephone number to be dialed substantially immediately within said outbound campaign;
    automatically dialing said telephone number as scheduled over said telephone line using a predictive dialer;
    continuously redialing said telephone number each time a busy signal is detected;
    connecting said telephone line to a second telephone of an available agent of a pool of agents, if an answer is detected;
    automatically dialing a regular telephone number of said outbound campaign as scheduled using said predictive dialer;
    rescheduling said regular telephone number to be dialed within said outbound campaign if a busy signal is detected; and
    connecting said regular telephone line to said second telephone of said available agent of said pool of agents, if an answer is detected.

12. The method of claim 11 further including the act of rescheduling said telephone number to be dialed within said outbound campaign if no answer is detected.

13. The method of claim 11 further including the act of attempting to immediately connect said inquiring party to an available agent over said telephone line.

14. The method of claim 11 wherein said telephone number is scheduled for an immediate call back.

15. The method of claim 11 further including the act of adding said telephone number to a future call campaign, if no connection is made.

16. The method of claim 11 wherein said call back data includes at least one time to be called back, wherein said telephone number is scheduled according to said time to call back.

17. A system for managing resources of a call center operating inbound and outbound call campaigns and minimizing an automatic telephone call back comprising:
    a first location including a telephone line and a data terminal and a telephone both connected to said telephone line, said data terminal generating a call back request requesting a call back to said telephone over said telephone network, wherein said first location cannot support voice and data communication simultaneously;
    a data path interface, coupled to said telephone line, for receiving said call back request over said telephone line, for identifying call back data from said request, and for placing said call back data into at least one call record store for an outbound campaign;
    an automated dialer system, located at a second location remote from said first location and coupled to said data path interface, and responsive to said at least one call record store, for automatically retrieving telephone numbers to be dialed from said call record store, and for processing said telephone numbers as an outbound telephone call campaign; and means for causing said automated dialer system to substantially immediately dial said telephone number to be dialed over said telephone line and for substantially immediately and continuously redialing said telephone number to be dialed each time said telephone number dialer detects a busy signal, for causing said automated dialer system to reschedule said telephone number to be dialed within said outbound campaign if no answer is detected, and for causing said automated dialer system to reschedule a regular telephone number each time said regular telephone number dialer detects a busy signal.

* * * * *